(12) United States Patent
Miyazaki et al.

(10) Patent No.: US 10,445,149 B2
(45) Date of Patent: Oct. 15, 2019

(54) METHOD FOR CONTROLLING MULTIPLE DEVICES CONNECTED VIA NETWORK

(71) Applicant: Panasonic Intellectual Property Corporation of America, Torrance, CA (US)

(72) Inventors: Ryota Miyazaki, Osaka (JP); Tomonori Nakamura, Osaka (JP); Hiroko Sugimoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 287 days.

(21) Appl. No.: 15/171,215

(22) Filed: Jun. 2, 2016

(65) Prior Publication Data

US 2016/0364275 A1 Dec. 15, 2016

(30) Foreign Application Priority Data

Jun. 12, 2015 (JP) ................................. 2015-119387
Feb. 19, 2016 (JP) ................................. 2016-030159

(51) Int. Cl.
*G06F 9/52* (2006.01)
*H04L 12/24* (2006.01)
(Continued)

(52) U.S. Cl.
CPC ............. *G06F 9/52* (2013.01); *H04L 12/2821* (2013.01); *H04L 41/0873* (2013.01); *H04L 43/0811* (2013.01)

(58) Field of Classification Search
CPC ... G06F 9/52; H04L 41/0873; H04L 12/2821; H04L 43/0811
See application file for complete search history.

(56) References Cited

U.S. PATENT DOCUMENTS

2010/0169146 A1* 7/2010 Hoyne ................. G06Q 10/109
                                                    705/7.21
2010/0217418 A1* 8/2010 Fontanot ................ G06Q 10/06
                                                    700/100

(Continued)

FOREIGN PATENT DOCUMENTS

JP         2004-056466         2/2004
JP         2004-248043         9/2004
(Continued)

*Primary Examiner* — Francisco J Aponte
*Assistant Examiner* — Kevin X Lu
(74) *Attorney, Agent, or Firm* — Greenblum & Bernstein, P.L.C.

(57) ABSTRACT

A method causing a processor to execute operations includes managing a plurality of first settings, one of the plurality of first setting being to control a first device in case that an operation status of a second device which is interconnected to the first device via a network has changed, receiving a second setting, the second setting being to control a third device in case that an operation status of a fourth device which is interconnected to the third device via the network has changed, determining whether conflicting operations are to be performed on a device when the plurality of first settings and the second setting are executed, extracting a setting from the first settings and the second setting, which is a cause of the conflicting operations in case that, in the determining, the conflicting operations are determined and transmitting a notification to divide a time during which the setting extracted in the extracting is executed.

13 Claims, 11 Drawing Sheets

(51) Int. Cl.
*H04L 12/28* (2006.01)
*H04L 12/26* (2006.01)

(56) References Cited

U.S. PATENT DOCUMENTS

| | | | |
|---|---|---|---|
| 2016/0117195 A1* | 4/2016 | Wang | G06F 17/30474 |
| | | | 707/770 |
| 2016/0161927 A1* | 6/2016 | Zave | G05B 15/02 |
| | | | 700/275 |
| 2016/0315996 A1* | 10/2016 | Ha | H04L 67/025 |
| 2016/0344569 A1* | 11/2016 | Chun | G06F 3/04842 |

FOREIGN PATENT DOCUMENTS

| | | | | |
|---|---|---|---|---|
| JP | 2005-130423 A | | 5/2005 | |
| JP | 2011-130285 A | | 6/2011 | |
| KR | 20160125244 A | * | 10/2016 | ........... H04L 67/025 |

* cited by examiner

| SETTING NO. | TRIGGER | | EXECUTION | | CONDITION | |
|---|---|---|---|---|---|---|
| | LOCATION/ DEVICE | VALUE CHANGE POINT | LOCATION/ DEVICE | VALUE | TYPE | VALUE |
| 1 | ENTRANCE/ DOOR | CLOSE ↓ OPEN | HALL/ LIGHT | ON | TIME BAND | NIGHT 18:00– 24:00 |
| 2 | ENTRANCE/ DOOR | CLOSE ↓ OPEN | ALL ROOMS/ AIR CLEANER | ON | NONE | |
| 3 | LIVING ROOM/ LIGHT | ON ↓ OFF | STAIRCASE/ LIGHT | ON | TIME BAND | NIGHT 18:00– 24:00 |
| 4 | STAIRCASE/ LIGHT | OFF ↓ ON | BED ROOM/ LIGHT | ON | TIME BAND | NIGHT 18:00– 24:00 |
| 5 | STAIRCASE/ LIGHT | OFF ↓ ON | BED ROOM/ AROMA DIFFUSER | ON | TIME BAND | NIGHT 18:00– 24:00 |
| 6 | BED ROOM/ AROMA DIFFUSER | OFF ↓ ON | BED ROOM/ AIR CLEANER | OFF | NONE | |
| 7 | HALL/ LIGHT | OFF ↓ ON | STAIRCASE/ LIGHT | ON | TIME BAND | NIGHT 18:00– 24:00 |
| ⋮ | | | | | | |

(columns labeled 62, 63, 64, 65)

FIG. 10

| HALL LIGHT | | STAIRCASE LIGHT | | BEDROOM LIGHT | | TV | |
|---|---|---|---|---|---|---|---|
| TIME | CONTROL | TIME | CONTROL | TIME | CONTROL | TIME | |
| | | | | | | 6:00 | ON |
| | | | | | | 8:00 | OFF |
| | | | | | | | |
| 20:00 | ON (No. 7) | 20:00 | ON | 20:00 | ON (No. 4) | 20:10 | ON |
| | | | | | | | |
| | | | | 23:00 | OFF | 22:55 | OFF |
| | | | | | | OPERATION WITHIN 10 MINUTES BEFORE OR AFTER | |

COMING HOME

DURING SLEEP

METHOD FOR CONTROLLING MULTIPLE DEVICES CONNECTED VIA NETWORK

BACKGROUND

1. Technical Field

The present disclosure relates to techniques for controlling, in a coordinated manner, multiple home electronics interconnected via a network. In particular, the present disclosure is related to a technique that avoids a conflict of control when different control operations are configured to operate on the same device at the same timing.

2. Description of the Related Art

Japanese Unexamined Patent Application Publication No. 2004-56466 discloses a system including a server and a device that is installed at home and communicates with the server via a communication network, such as the Internet.

In such a system, the server and a home gateway set a control rule in accordance with the statuses of home electronics and weather forecast services such that the multiple home electronics operate in coordination with the weather forecast service. The system thus causes the home electronics and the services to operate in a coordinated fashion. However, if different control operations are performed on the same device at the same timing, a conflict of control may occur.

To solve this problem, the technique disclosed in Japanese Unexamined Patent Application Publication No. 2004-56466 avoids the conflict of control by making a rule in advance. Such a rule includes placing a higher priority on a newly set control operation, or placing a higher priority on a control operation having a specified time period.

Japanese Unexamined Patent Application Publication No. 2004-248043 discloses a technique that selects an appropriate control program from among control programs corresponding to various control conditions in advance when control conditions of home electronics serving as control targets include two or more commands having mutually inconsistent contents.

There is still room for improvements in order to avoid the conflict of control on the same device.

SUMMARY

In one general aspect, the techniques disclosed here feature a control method performed by a processor. The control method includes, on condition that an operational status of at least one of two or more devices interconnected to the processor via a network has changed during a predetermined time band, managing two or more of first settings to control another device, receiving a second setting to control a second device on condition that an operational status of a first device has changed during a first time band, determining in accordance with the first settings and the second setting whether conflicting control operations are to be performed on one of the two or more devices during the first time band, extracting a pair of third settings, from at least the first settings out of the first settings and the second setting, which becomes a cause of the conflicting control operations if the conflicting control operations are determined to be performed, and transmitting a notification to segment a time band of control at the pair of third settings such that control operations at the pair of third settings are not concurrently performed during the first time band.

In accordance with the disclosure, the conflict of control is more appropriately avoided by focusing on a time band set as an operating condition in each of multiple coordinated control operations.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates an example of a coordinated control setting table of the first embodiment;

FIG. 10 illustrates an example of log information to be stored on a database (DB)

DETAILED DESCRIPTION

Figure 1:
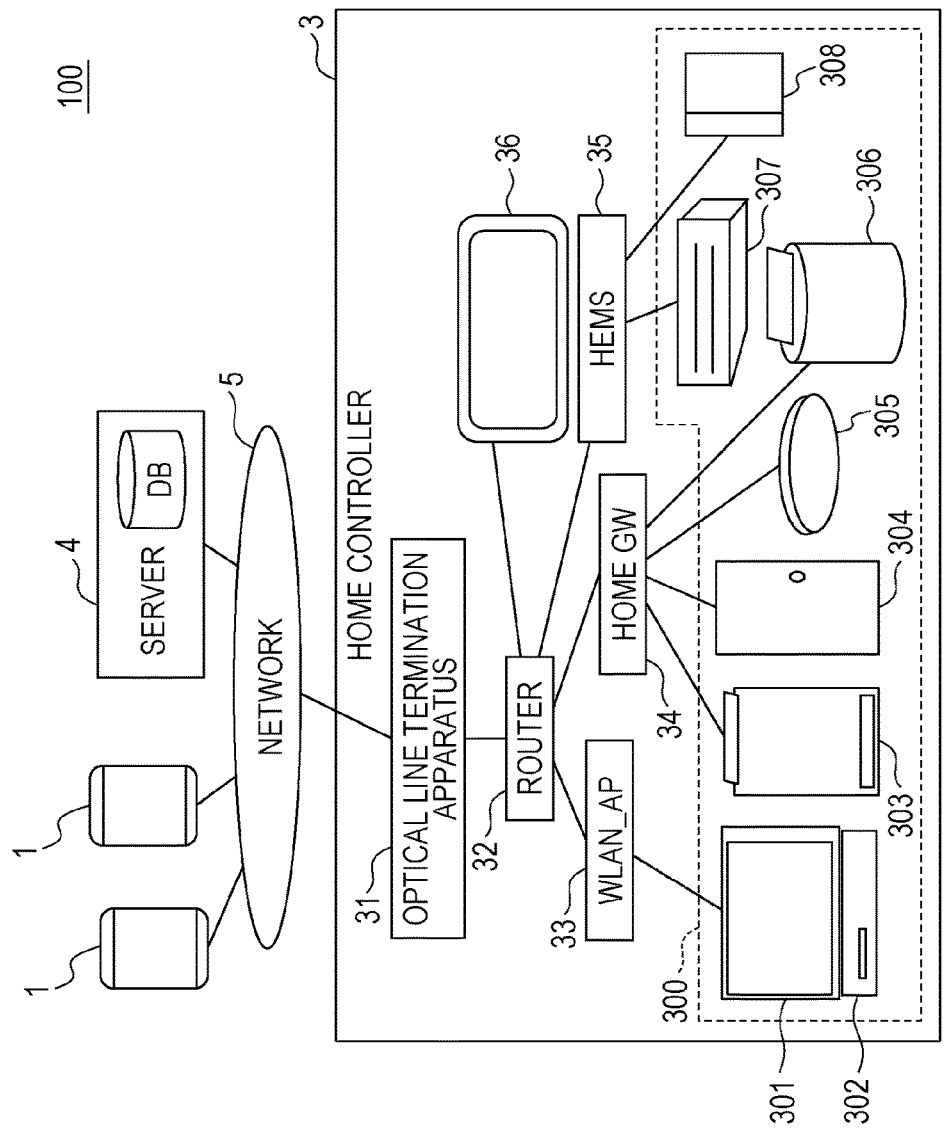
FIG. 1 is a block diagram generally illustrating an example of a device coordinated setting control system of a first embodiment.

Underlying Knowledge Forming Basis of the Present Disclosure

The related art technique disclosed in Japanese Unexamined Patent Application Publication No. 2004-56466 avoids the conflict of control by placing a higher priority on a newly set control operation or on a control operation having a specified time period. However, a user may desire a control operation that is not the newly set control operation, or a control operation having no specified time period. In such a case, control satisfying the user's request may not be implemented.

A setting may be established such that if a given condition is satisfied on a target device that is a control target among home electronics, the target device is set to be powered on, and such that if a condition different from the given condition is satisfied, the target device is set to be powered off. If the two conditions are satisfied at the same timing, mutually inconsistent control commands of power-on and power-off are provided to the same target device, and a conflict of control happens.

If the setting is applied to the technique disclosed in Japanese Unexamined Patent Application Publication No. 2004-56466, the control operation for power-off that is newly set has a priority. If the control operation desired by the user is the power-on, the control operation against the user's intention is performed.

In accordance with the technique disclosed in Japanese Unexamined Patent Application Publication No. 2004-248043, the priority order of the conditions needs to be set in advance if there is a device that needs to operate in a predetermined control operation. For this reason, each time a control setting added, resetting the entire priority order may be performed, and may be time-consuming.

As described above, the related art technique that avoids the conflict of control on the same device does not necessarily meet the user's intention because the related art technique sets a fixed-priority on one of the control operations. To set the fixed-priority, a large number of settings need to be set to avoid a variety of conflict patterns. This results in an increase in a process workload of a control apparatus that performs conflict avoidance, and imposes a burden on the user who newly registers a setting or updates the setting.

The disclosure has been developed in view of the problem, and is intended to provide a technique that easily avoids the conflict of control on the same device in response to the user's intention.

According to an aspect of the disclosure, there is provided a control method performed by a control apparatus that controls two or more devices interconnected via a network. The control method includes on condition that an operational status of at least one of two or more devices interconnected to the control apparatus via a network has changed during a predetermined time band, managing two or more of first settings to control another device, receiving a second setting to control a second device on condition that an operational status of a first device has changed during a first time band, determining in accordance with the first settings and the second setting whether conflicting control operations are to be performed on one of the two or more devices during the first time band, extracting a pair of third settings, from at least the first settings out of the first settings and the second setting, which becomes a cause of the conflicting control operations if the conflicting control operations are determined to be performed, and transmitting a notification to segment a time band of control at the pair of third settings such that control operations at the pair of third settings are not concurrently performed during the first time band.

In accordance with the aspect, a determination is made to determine whether the conflicting control operations are to be performed on the one of the two or more devices connected to the network during the first time band if the second setting to control the second device is received on condition that the operational status of the first device has changed during the first time band. If the conflicting control operations are determined to be performed on the one of the devices, the pair of third settings which becomes a cause of the conflicting control operations is extracted from at least the first settings out of the first settings and the second setting. The notification to segment the time band of control at the pair of third settings is transmitted such that control operations at the pair of third settings are not concurrently performed during the first time band. The user who has received the notification segments the time band of control as the third setting such that the time band of control at the third setting does not overlap the first time band.

When a new setting is added to control another device on condition that the operational status of a given device has changed during a given time band, multiple existing settings are executed in a coordinated fashion. Even if the execution of the conflicting control operations is attempted on a particular device as a result, the conflicting control operations are avoided.

The second setting is set on a terminal, including a display and interconnected to the control apparatus via the network, and the notification includes an indication displayed on the display and indicating an occurrence of the conflicting control operations.

Even if the user who sets a new second setting using the terminal is involved in the conflicting control operations, the terminal may notify the user of the occurrence of the conflicting control operations.

The notification displayed on the display may include information concerning a device that is under the conflicting control operations.

The user who is going to set a new setting may be notified of the device that is under the conflicting control operations as a result of the newly added setting.

The notification displayed on the display may include a message to receive an input as to whether contents of control at the pair of third settings is to be modified in order to avoid the conflicting control operations.

In order to avoid the conflicting control operations in accordance with this aspect, the notification displayed on the display includes the message to receive the input as to whether contents of the control at the pair of third settings is to be modified. In this way, the user who is going to set the second setting is notified that the conflicting control operations are avoidable by updating the contents of the control at the third setting.

The control method may further include displaying on the display a time band candidate of control at the pair of third settings to be segmented if the input to modify the contents of the control at the pair of third settings is received.

Since the time band candidate of control at the pair of third settings to be segmented is displayed on the display in accordance with this aspect, the user may easily set the setting to avoid the conflicting control operations.

The control method may further include displaying on the display a slide bar to segment the time band of control at the pair of third settings if the input to modify the contents of control at the pair of third settings is received.

In this way, the user may easily perform an intuitive operation to set the setting to avoid the conflicting control operations that may be caused by newly adding a setting.

A determination as to whether the conflicting control operations are to be performed or not is made in a simulation that traces the control at the first settings and the second setting.

Since the simulation that traces the control at the first settings and the second setting is performed to determine whether the conflicting control operations are performed or not, a precise determination results.

According to another aspect of the disclosure, there is provided a control method performed by a control apparatus that controls two or more devices connected via a network. The control method includes on condition that an operational status of at least one of the two or more devices interconnected to the processor via a network has changed during a predetermined time band, managing two or more of first settings to control another device, receiving a second setting to control a second device on condition that an operational status of a first device has changed during a first time band, determining in accordance with the first settings and the second setting whether conflicting control operations are to be performed on one of the two or more devices during the first time band, and extracting a pair of third settings, from at least the first settings out of the first settings and the second setting, which becomes a cause of the conflicting control operations if the conflicting control operations are determined to be performed, and avoiding the conflicting control operations by adding an operational status of a predetermined device from among the two or more devices to one control condition of the pair of third settings.

Since the operational status of the predetermined device is added to the condition of the control condition of the one of pair of third settings in this aspect, the occurrence of the conflicting control operations is controlled.

The control method may further include managing log information related to a log of operational statuses of the two or more devices, extracting as one of the pair of third settings a fourth setting that is one of the first settings changing in coordination with the second setting, and, in response to the log information, determining a correlative device having a higher frequency of occurrence that a control operation to set a first operational status is performed within a predetermined period of time prior to or subsequent to a start of a control operation at the extracted fourth setting, and that a control operation to set a second operational status different from the first operational status is performed within a predetermined period of time prior to or subsequent to an end of the control operation at the fourth setting, and adding, to the condition of control at the fourth setting, information that the correlative device is in the second operational status.

In accordance with this aspect, the fourth setting that is one of the first settings changing in coordination with the second setting is extracted. The correlative device is determined from the log information. The correlative device has a higher frequency of occurrence that the control operation to set the first operational status is performed within the predetermined period of time prior to or subsequent to the start of the control operation at the fourth setting, and that the control operation to set the second operational status is performed within the predetermined period of time prior to or subsequent to the end of the control operation at the fourth setting. The information that the correlative device is in the second operational status is added to the condition of control at the fourth setting to correct the fourth setting.

There is a low possibility that the correlative device is in the second operational status at the start of the control at the fourth setting prior to the correction. If the condition that the correlative device is in the second operational status is added as a condition for the fourth setting prior to the correction, the execution of the fourth setting in coordination with the second setting is avoided. As a result, the conflicting control operations are avoided.

Each of the embodiments described below represents a specific example of the disclosure. Numerical values, shapes, elements, steps and the order of the steps in the embodiments are described for exemplary purposes only, and are not intended to limit the disclosure. Elements not described in independent claims indicative of a generic concept, from among the elements of the embodiments, may be any elements. Contents of the embodiments may be combined in use.

First Embodiment

A general configuration of a device coordinated control system 100 of a first embodiment is described below.

1.1 General Configuration of Device Coordinated Control System

FIG. 1 illustrates the general configuration of the device coordinated control system 100 to which a control apparatus of the first embodiment is applied.

The device coordinated control system 100 of FIG. 1 includes multiple control target devices 300, control apparatuses (a wireless LAN access point (WLAN_AP) 33, a home gateway (GW) 34, a home energy management system (HEMS) 35, and a home controller 36), and a server 4. The control apparatuses control the control target devices 300 and at least one information terminal 1 that sets control settings on at least one of the control target devices 300 via a network 5. These devices are mutually interconnected to each other via the network 5.

The information terminal 1 is a portable device including a display with a touchpanel function. The information terminal 1 may be a smart phone or a tablet. The information terminal 1 is not limited to these devices. The information terminal 1 may be any type of device as long as the device includes a display with a touchpanel function and is connectable to the control target devices 300 in a home 3 and the server 4 via the network 5. The following discussion is based on the premise that the information terminal 1 is a smart phone.

Multiple devices are installed in the home 3 illustrated in FIG. 1, and, for example, include an optical line termination apparatus 31, router 32, WLAN_AP 33, home gateway (HGW) 34, HEMS 35, home controller 36, and multiple control target devices 300. These devices are included in the device coordinated control system 100. The control apparatus related to the first embodiment is implemented in the server 4. Alternatively, the control apparatus may be implemented in the router 32, the HGW 34, the HEMS 35, or the home controller 36.

The home controller 36 has a function of a remote controller that makes a process request to the control target device 300.

The control target devices 300 are home electronics including a television 301, Blu-ray disc (BD) (registered trademark) recorder 302, an air cleaner 303, an entrance door 304, a light 305, an aroma diffuser 306, an air-conditioner 307, and a water heater 308. The control target devices 300 may further include a refrigerator, and a washing machine.

The control target device 300 may be network-connected to the server 4 via the HGW 34. In response to a process request from the HGW 34, the control target device 300 performs a predetermined process and notifies the HGW 34 of process results. The processes performed in response to the process request may include not only a process related to the operation of each control target device 300, such as changing a setting for power-on or power-off of each control target device 300, but also transmitting an email, and posting anything on the social network service (SNS).

The HGW 34 notifies the control target device 300 in the home 3 of a process request from the server 4 while notifying the server 4 of information acquired from the control target device 300 and the process results.

The network 5 may be a local-area network, a wide-area network, such as the Internet, or a combination thereof. In the discussion of the first embodiment, the network 5 is the Internet.

The server 4 receives a coordinated control setting from the information terminal 1 via the network 5. On condition that the operational status of at least one of two or more devices has changed during a predetermined time band, the coordinated control setting controls another device. For example, if the entrance door 304 is opened, the light 305 is turned on as long as the time is between 18:00 through 24:00. Such a setting is the coordinated control setting.

On a per home 3 basis, the server 4 manages a coordinated control setting table 61 (see FIG. 6) having two or more coordinated control settings registered therein. Upon receiving a new coordinated control setting from the information terminal 1, the server 4 simulates the tracing to the coordinated control setting table 61 in order to determine whether conflicting control operations are performed on a control target device 300. The conflicting control operations are contradictory to each other. For example, an on control operation and an off control operation are provided to a given control target device 300 at the same time.

Upon determining that the conflict of control is going to occur, the server 4 extracts from the coordinated control setting table 61 a pair of coordinated control settings that may cause the conflict of control. The server 4 transmits to the information terminal 1 a notification that a time band specified by the pair of coordinated settings is to be segmented such that the extracted pair of coordinated settings is not performed in an overlap fashion during a time band specified by a new coordinated control setting.

The server 4 enquires the HGW 34 about information needed to control the control target device 300. If the condition is satisfied, the server 4 notifies the control target device 300 of a process request via the HGW 34.

The optical line termination apparatus 31 connects the router 32 to the network 5. The router 32 relays communications between the optical line termination apparatus 31 and the WLAN_AP 33, the HGW 34, the HEMS 35, and the home controller 36.

The WLAN_AP 33 relays communications between the control target device 300 supporting the wireless LAN (the television 301 in FIG. 1) and the router 32. The HGW 34 relays communications between the router 32 and the control target devices 300 (the air cleaner 303, the entrance door 304, the light 305, and the aroma diffuser 306 in FIG. 1) supporting the HGW 34. The HEMS 35 relays communications between the router 32 and the control target devices 300 (the air-conditioner 307 and the water heater 308 in FIG. 1) supporting the HEMS 35.

1.2 Configuration of Information Terminal

Figure 2:
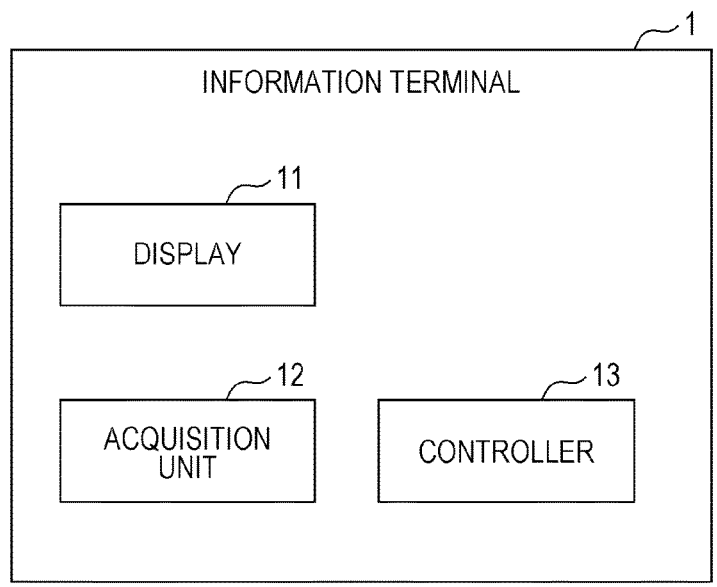
FIG. 2 illustrates a configuration example of an information terminal of the first embodiment.

FIG. 2 is a block diagram illustrating the configuration of the information terminal 1 in the first embodiment. The information terminal 1 has a function for requesting the server 4 to set the coordinated control setting.

The information terminal 1 is described in detail. Referring to FIG. 2, the information terminal 1 includes a display 11, an acquisition unit 12, and a controller 13. The acquisition unit 12 includes a central processing unit (CPU), and a communication device to connect the information terminal 1 to the network 5. The controller 13 is a computer including a CPU, a read-only memory (ROM), a random-access memory (RAM), and the like.

The display 11 includes a touch display, and displays a display screen including a user interface that receives at least a touch input. Under the control of the controller 13, the display 11 displays the display screen. More specifically, the display 11 displays the display screen, including an operation menu configured to receive the coordinated control setting, in a display form determined by the controller 13.

The acquisition unit 12 acquires via the network 5 a control index that determines the display form of the display screen displayed on the display 11 in the information terminal 1.

The control index is any combination of pieces of information including a location of the control target device 300, information that controls the control target device 300, an attribute of the control target device 300, a status of the control target device 300, and a functional attribute of the control target device 300.

The controller 13 causes the display 11 to display, on the display screen thereof, information needed for the coordinated control setting together with the control target device 300 serving as a control target and a service candidate. The controller 13 displays at least one selection menu on the display screen on the display 11 in accordance with the display form determined in accordance with the control index acquired by the acquisition unit 12.

To cause a user to input the coordinated control setting, the controller 13 may display on the display screen the user interface that links control target devices 300 serving as coordination targets from among the control target devices 300.

In this case, the controller 13 may simply display on the display screen the user interface which links icons respectively representing multiple control target devices 300 using arrow marks.

The controller 13 may cause the display 11 to display a selection menu that allows multiple control target devices 300 to be coordinated in response to a given trigger.

If the coordinated control setting with the on control operation conflicting with the off control operation is input to the same device at the same timing, the controller 13 may cause the display 11 to display the display screen that prompts the time band set as the condition for the coordinated control setting to be segmented.

1.3 Configuration of Server

Figure 3:
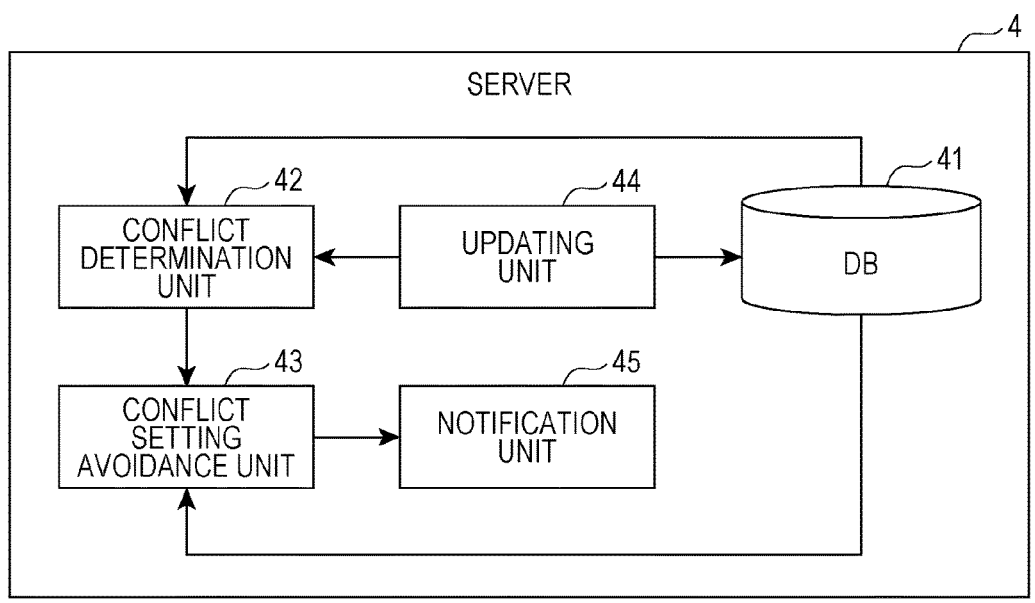
FIG. 3 illustrates a configuration example of a server of the first embodiment.

FIG. 3 illustrates the configuration example of the server 4 of the first embodiment.

The server 4 includes a database (DB) 41, a conflict determination unit 42, a conflict setting avoidance unit 43, an updating unit 44, and a notification unit 45.

The conflict determination unit 42 is an example of a determiner, the updating unit 44 is an example of a manager and a receiver, and the conflict setting avoidance unit 43 is an example of an extracter. The conflict determination unit 42 and the conflict setting avoidance unit 43 may be implemented when a CPU executes a program. The DB 41 may include a non-volatile storage device. The updating unit 44 and the notification unit 45 may include a CPU and a communication device that connects a computer to the network 5, and may be implemented when a CPU executes a program.

When the updating unit 44 receives a new coordinated control setting from the information terminal 1, the conflict determination unit 42 simulates the tracing to the coordinated control setting table 61 stored on the DB 41 and then determines whether a conflict of control occurs on a control target device 300 from among the control target devices 300 connected to the network 5.

If the conflict determination unit 42 determines that a conflict of control occurs, the conflict setting avoidance unit 43 extracts from the coordinated control setting table 61 a pair of coordinated control settings that becomes a cause of the conflict of control.

Upon receiving a new coordinated control setting from the information terminal 1, the updating unit 44 registers the received coordinated control setting on the coordinated control setting table 61 (see FIG. 6) stored on the DB 41.

The updating unit 44 acquires the current operational statuses of the control target devices 300 from the WLAN_AP 33, the HGW 34, and the HEMS 35 which monitor changes in the statuses of the control target devices 300, and updates current status information of the control target devices 300 stored on the DB 41.

The notification unit 45 transmits to the information terminal 1 a notification that the time band of the pair of coordinated control settings is to be segmented such that the pair of coordinated control settings extracted by the conflict setting avoidance unit 43 does not overlap in time band specified by the newly added coordinated control setting as a condition.

Figure 4A:
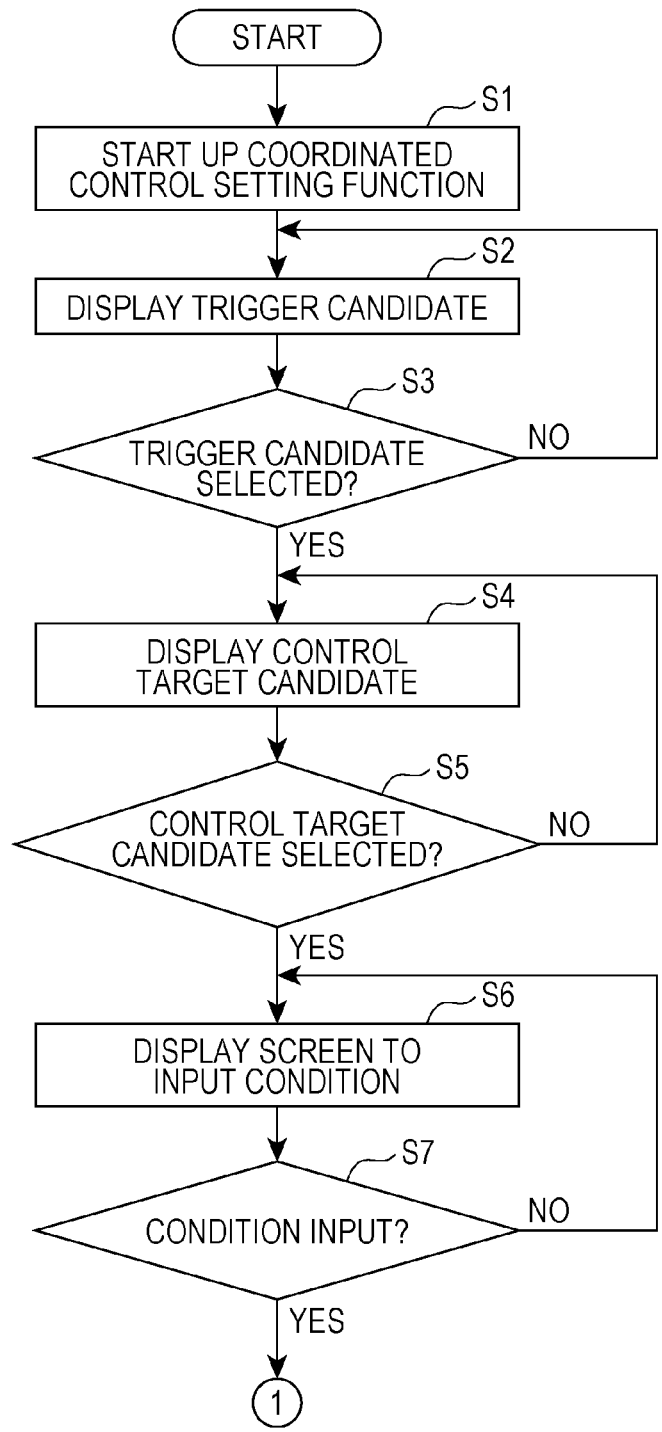
FIG. 4A is a flowchart illustrating an operation example of the device coordinated setting control system of FIG. 1 when a new coordinated control setting is input.
Figure 4B:
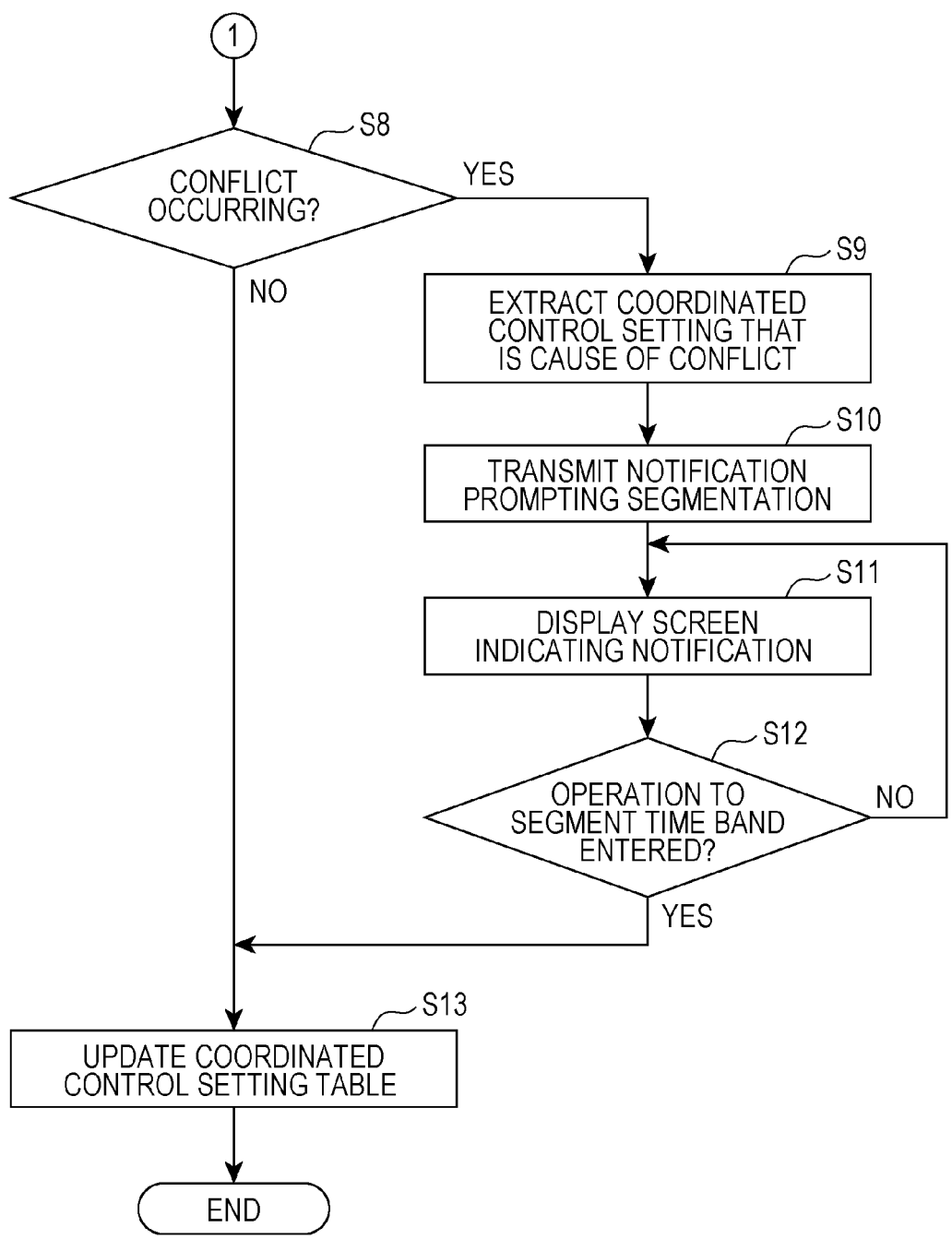
FIG. 4B is a flowchart illustrating an operation example of the device coordinated setting control system of FIG. 1 when the new coordinated control setting is input.

FIG. 4A and FIG. 4B are flowcharts illustrating a routine of the device coordinated control system 100 of FIG. 1 performed when a new coordinated control setting is input.

The information terminal 1 starts up the coordinated control setting function in response to an operation from the user (S1). An application to execute the coordinated control setting function is installed in advance on the information terminal 1. When the user inputs an operation to execute the application, the operation in S1 is performed.

The notification unit 45 in the server 4 causes the display 11 in the information terminal 1 to display a trigger candidate serving as a startup condition of the coordinated control setting (S2). The trigger candidates include the control target device 300, sensors, or service candidates. The acquisition unit 12 in the information terminal 1 acquires the control index from the server 4, and the controller 13 in the information terminal 1 causes the display 11 to display the selection menu configured to allow the user to select a trigger candidate in the display form meeting the acquired control index.

The selection menu may have a layer structure. The layer structure includes a first layer including an item for selecting a control target device 300, a sensor, or a service, a second layer including an item for selecting a type, and a third layer for selecting a detailed setting. The services provided to users may include a weather forecast service, a stock price information service, and a security service.

If an item is selected from the selection menu at the first layer, the controller 13 in the information terminal 1 displays on the display 11 the selection menu at the second layer responsive to the selected item. For example, if a sensor is selected at the first layer, the selection menu at the second layer displays an item "entrance door opening/closing" for selecting a door opening/closing sensor of an entrance, and an item "garage opening/closing" for selecting a garage opening/closing sensor of a garage. The type selected at the second layer includes a device and the installation location of the device.

If an item is selected from the selection menu at the second layer, the controller 13 causes the display 11 to display the selection menu at the third layer responsive to the selected item. For example, if the item "entrance door opening/closing" for selecting the door opening/closing sensor of the entrance is selected at the second layer, the selection menu at the third layer including an item for "opening" for opening the entrance door and an item for "closing" for closing the entrance door is displayed. If the user selects the item for "opening", the trigger is finalized. Through this menu, the user enters "location/device" and "value change point" listed under trigger 63 of FIG. 6.

The updating unit 44 in the server 4 determines whether the user has entered an operation to select a trigger candidate on the information terminal 1 (S3). If the operation to select a trigger candidate has not been entered in S3 (no branch from S3), the updating unit 44 returns to S2 to wait for an operation. If the operation to select a trigger candidate has been entered (yes branch from S3), the updating unit 44 proceeds to S4. In the selection menu having the layer structure described above, the determination result in S3 is yes if the item selection is complete at the third layer. The determination result in S3 is no if the item selection is not complete at the third layer.

The acquisition unit 12 in the information terminal 1 acquires from the server 4 via the network 5 the control index that determines the display form of the display screen, and the controller 13 in the information terminal 1 causes the display 11 to display on the display screen thereof a candidate of a control target device 300 operating in response to the trigger selected in S3 and a candidate of control contents responsive to the candidate of the control target device 300 (S4). The display screen may include a selection menu having the layer structure described above. Through the selection menu, the user enters "location/device" and "value" listed under execution 64 of FIG. 6.

The server 4 determines whether the user has entered an operation to select the control target device 300 and the contents of control to the control target device 300 from among the candidates displayed on the display screen, using the information terminal 1 (S5). If the server 4 is not unable to verify that the user has entered an operation to select the control target device 300 and the contents of control to the control target device 300 (no branch from S5), the server 4 returns to S4, and waits until the operation has been input.

The acquisition unit 12 in the information terminal 1 acquires from the server 4 via the network 5 the control index that determines the display form of the display screen, and causes the display 11 to display the display screen on which a condition to control the control target device 300 selected in S5 is input (S6). The condition input here is a condition that restricts the time band throughout which the trigger selected in S3 is generated.

"Opening the entrance door" may now be selected as a trigger, "turning on the light" may be selected as the control target device 300 and the contents of control, and a "night time band 18:00 through 24:00" may be selected as a condition. Even if "the door is opened" during a time band other than "night time band 18:00 through 24:00", the light is not turned on.

Figure 5:
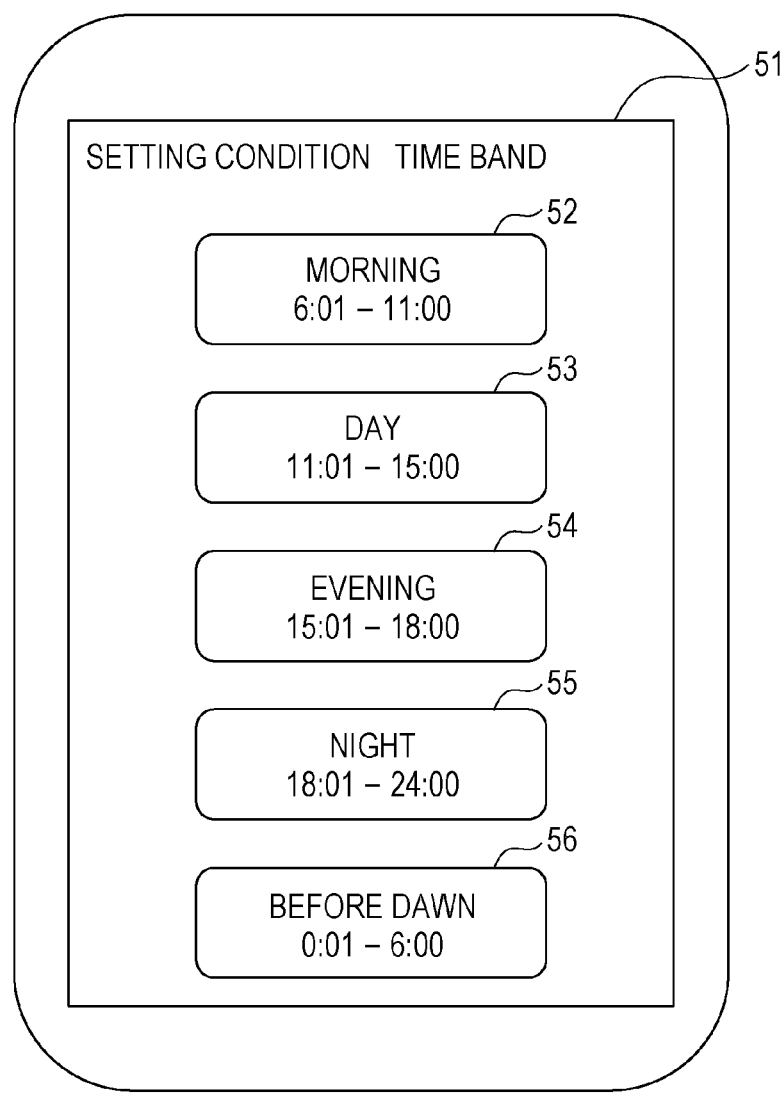
FIG. 5 illustrates an example of a display screen displayed on a display when a time band is set.

FIG. 5 illustrates an example of a display screen 51 displayed on the display 11 when the time band is set. The display screen 51 displays five selection boxes 52 through 56, namely, morning (6:01-11:00), day (11:01-15:00), evening (15:01-18:00), night (18:01-24:00), and before dawn (0:01-6:00). The user may select a desired one from the five selection boxes 52 through 56. From the standpoint of easy setting, the display screen 51 has a display form that allows the user to select one time band from the five time bands into which one day is segmented.

Turning to FIG. 4A, the updating unit 44 in the server 4 verifies that the user has entered the condition on the display screen displayed in S6 on the information terminal 1 (S7). The updating unit 44 herein verifies that one selection box has been selected from the selection boxes 52 through 56 displayed on the display screen 51 on the information terminal 1. Optionally, the display screen 51 may include a selection box for no condition (not illustrated). If the updating unit 44 is not unable to verify in S7 that the condition has been entered (no branch from S7), the updating unit 44 returns to S6 and waits until the condition has been entered.

The conflict determination unit 42 in the server 4 references the DB 41 for the coordinated control setting table 61 having the coordinated control setting set in the past, and determines whether a coordinated control setting currently added causes a conflict of control on the same control target device 300 at the same timing (S8).

The conflict determination is specifically described with reference to an example of FIG. 6. FIG. 6 illustrates an example of the coordinated control setting table 61 of the first embodiment. In the coordinated control setting table 61, a single coordinated control setting is registered for a single record. The coordinated control setting table 61 thus stores a setting 62, a trigger 63, an execution 64, and a condition 65 in association with each other. Referring to FIG. 6, coordinated control settings No. 1 through No. 6 correspond to examples of first settings, and No. 7 coordinated control setting corresponds to an example of a second setting.

The setting 62 is an identifier of the coordinated control setting. Referring to FIG. 6, the setting 62 lists a numerical value that increases one by one in the order of setting. The trigger 63 is a start condition of the coordinated control setting, and includes a "location/device" and a "value change point". The "location/device" indicates a trigger device (the control target device 300, the sensor or the service) serving as the starting condition of the coordinated control setting, and the installation location of the trigger device in the home 3.

The "value change point" indicates contents of a change in the operational status of the trigger device indicated by the "location/device". More specifically, a change of the operational status of the trigger device indicated by the "location/device" to contents of a change indicated at the "value change point" serves as a trigger to start the coordinated control setting.

The execution 64 lists contents of control that are executed in response to the trigger 63, and includes a "location/device" and a "value". The "location/device" indicates the control target device 300 that is operated in response to the trigger 63, and the installation location of the control target device 300 in the home 3. The "value" indicates the contents of control to the control target device 300 indicated by the "location/device".

The condition 65 indicates a condition that the trigger 63 needs to satisfy to start the coordinated control setting, and includes a "type" and a "value". The "type" indicates the type of the condition 65, and is the "time band" in the example of FIG. 6. The "value" indicates contents of the "type", and is a numerical value indicating the "time band" in the example of FIG. 6.

In the example of FIG. 6, coordinated control setting No. 1 of "trigger: opening entrance door, execution: turning on hall light, and condition: night (18:00-24:00)" and coordinated control setting No. 2 of "trigger: opening entrance door, execution: turning on air cleaners in all rooms, and condition: none" are registered to perform coordinated control when the user comes home at night.

Next, coordinated control setting No. 3 of "trigger: turning off living room light, execution: turning on staircase light, and condition: night (18:00-24:00)", coordinated control setting No. 4 of "trigger: turning on staircase light, execution: turning on bedroom light, and condition: night (18:00-24:00)", and coordinated control setting No. 5 of "trigger: turning on bedroom light, execution: turning on aroma diffuser in bedroom, and condition: night (18:00-24:00)" are registered to perform coordinated control when the user goes to bed at night.

Coordinated control setting No. 6 of "trigger: turning on aroma diffuser in bedroom, execution: turning off air cleaner in bedroom, and condition: none" is registered such that an aroma generated by the aroma diffuser is not removed by the air cleaner.

Under these settings, coordinated control setting No. 7 of "trigger: turning on hall light, execution: turning on staircase light, and condition: night (18:00-24:00)" may now be added to extend coordinated control during sleep.

If the entrance door is opened during the night (18:00-24:00), the trigger 63 and the condition 65 of coordinated control settings No. 1 and No. 2 intended to perform coordinated control when the user comes home at night are satisfied. "Turning on hall light" and "turning on air cleaners in all rooms" are thus executed. The trigger 63 "turning on hall light" and the condition 65 "night (18:00-24:00)" in coordinated control setting No. 7 are thus satisfied, and "turning on staircase light" is executed. The trigger 63 "turning on staircase light" and the condition 65 "night (18:00-24:00)" in coordinated control setting No. 4 are satisfied, and "turning on bedroom light" is executed.

In succession, control operations for coordinated control settings No. 5 and No. 6 are executed, and "turning off bedroom air cleaner" is executed. On the other hand, coordinated control setting No. 2 causes the bedroom air cleaner to be turned on. As a result, a power-on operation and a power-off operation are concurrently performed on the bedroom air conditioner.

As described above, the coordinated control settings having different purposes are linked, causing a conflict of control on the same device at the same timing.

Figure 7:
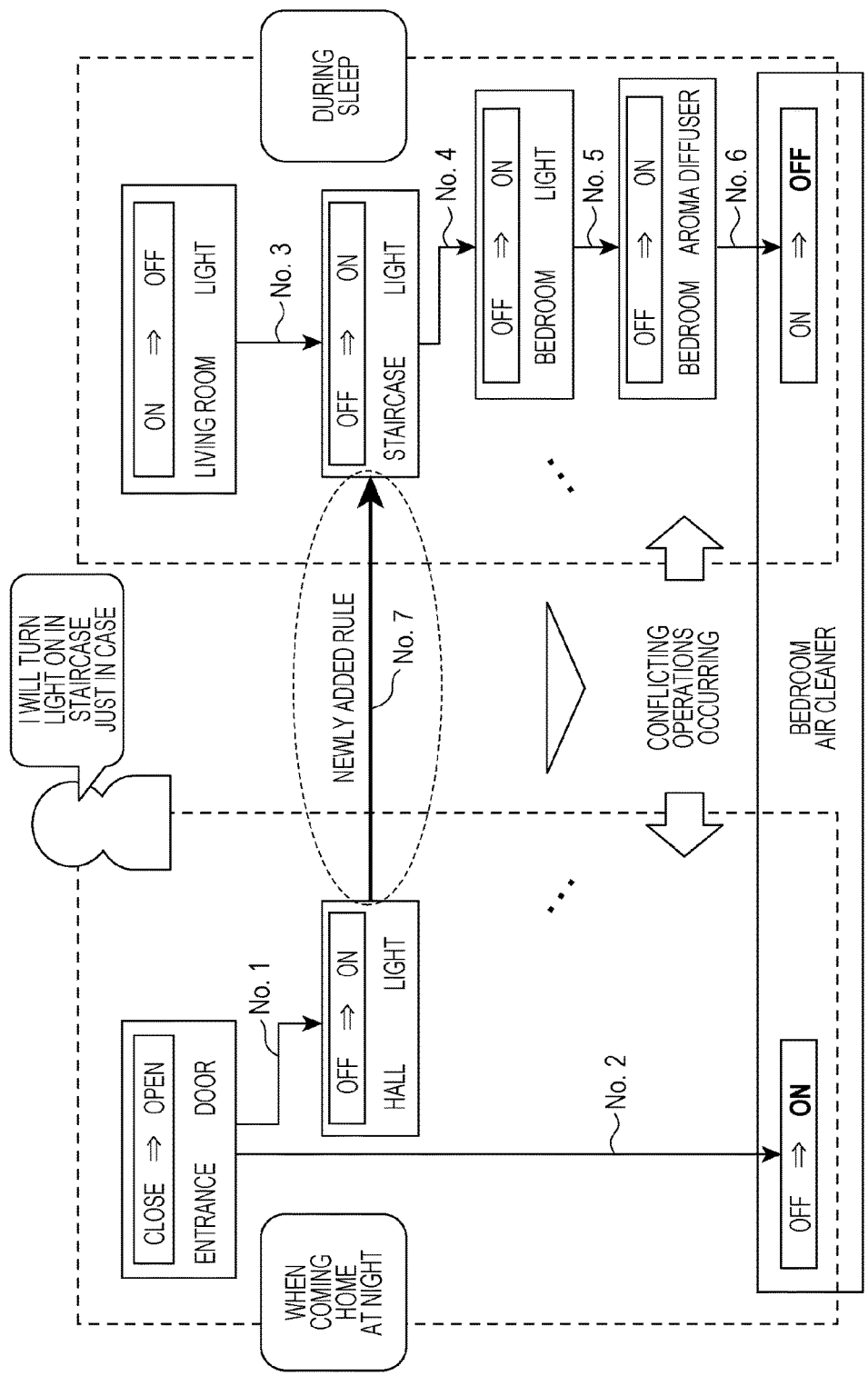
FIG. 7 illustrates the coordinated control setting table of FIG. 6 in the form of a tree structure.

FIG. 7 illustrates the coordinated control setting table 61 of FIG. 6 in the form of a tree structure. Referring to FIG. 7, a broken-line frame on the left-hand side of FIG. 7 illustrates the coordinated control setting when the user comes home at night, and a broken-line frame on the right-hand side of FIG. 7 illustrates the coordinated control setting during sleep at night. As illustrated in FIG. 7, each arrow labeled "No. plus numeral" indicates the corresponding setting 62 in FIG. 6.

If coordinated control settings No. 1 through No. 6 are set in FIG. 7, the user may think "the user himself may as well turn the light on in the staircase just in case", and then adds coordinated control setting No. 7. More specifically, a coordinated control setting to turn on the staircase light in coordination with turning on the hall light is newly added.

The execution of coordinated control setting No. 7 leads to executing coordinated control setting No. 4, and the coordinated control setting to be performed when the user comes home at night and the coordinated control setting during sleep are coordinated. As a result, the coordinated control settings No. 4→No. 5→No. 6 are executed. An off control operation of the bedroom air cleaner and an on operation of the bedroom air cleaner as a result of executing coordinated control setting No. 2 occurs concurrently, leading a conflict of control.

The conflict determination unit 42 determines whether a conflict of control occurs by simulating the tracing to the coordinated control settings registered in the coordinated control setting table 61. The simulation may be a technique of producing a tree of FIG. 7. Alternatively, the simulation may be a technique of repeating the tracing to the coordinated control settings registered in the coordinated control setting table 61 while successively changing a first coordinated control setting to be performed in order from coordinated control setting No. 1 to coordinated control setting No. 7 from among the coordinated control settings registered in the coordinated control setting table 61.

Alternatively, the simulation may be a technique of assigning logics IF, THEN, or THAT to each of the coordinated control settings in the coordinated control setting table 61.

Turning to FIG. 4B, if the conflict determination unit 42 determines in S8 that a conflict of control occurs (yes branch from S8), the conflict setting avoidance unit 43 extracts from the coordinated control setting table 61 a pair of coordinated control settings that may cause the conflict of control (S9).

In this case, the cause of the conflict of control is that the condition "night (18:00-24:00) of No. 7" matches the condition "night (18:00-24:00) of No. 1".

The time band may be segmented such that the conditions of the two coordinated control settings are not concurrently satisfied. Even if coordinated control setting No. 1 is executed, causing the trigger 63 of coordinated control setting No. 7 "turning on hall light", the condition 65 of coordinated control setting No. 7 is not satisfied. "Turning on staircase light" is not performed. Referring to FIG. 7, control operations of coordinated control settings No. 4, No. 5, and No. 6 in coordination with the execution of the control operation "turning on staircase light" are not performed. As a result, the on control operation and the off control operation are not concurrently performed on the bedroom air cleaner.

The conflict setting avoidance unit 43 extracts a pair of coordinated control settings that causes a conflict of control with a newly added coordinated control setting that overlaps the pair in time period. In the example of the tree of FIG. 7, coordinated control setting No. 1 is extracted from the coordinated control settings overlapping coordinated control setting No. 7 in time band in accordance with a rule that a higher coordinated control setting is to be extracted. This is an example only. Any coordinated control setting may be extracted as long as the coordinated control setting avoids the conflict of control. In this case, No. 1 and No. 7 correspond to a pair of third settings.

In order to avoid the conflict of control on the bedroom air cleaner as illustrated in FIG. 7, even if No. 7 is executed, no conflict of control occurs as long as one of No. 3, No. 4, and No. 5 between No. 6 and No. 7 is not executed. Coordinated control setting No. 7, and one of coordinated control settings No. 3, No. 4, and No. 5 may be extracted as a pair of coordinated control settings that causes a conflict of control.

In the above example, the conflict setting avoidance unit 43 includes the newly added coordinated control setting in the extracted pair of coordinated control settings. Alternatively, the conflict setting avoidance unit 43 may extract a pair of coordinated control settings causing a conflict of control from the existing coordinated control settings.

For example, as illustrated in FIG. 7, the conflict of control on the bedroom air cleaner is avoided by segmenting the time bands of coordinated control settings No. 1 and No. 2. The conflict setting avoidance unit 43 may thus extract coordinated control settings No. 1 and No. 2 as a pair of coordinated control settings causing the conflict of control. In the example of FIG. 7, the conflict of control on the bedroom air cleaner may be avoided by segmenting the time bands of coordinated control setting No. 1 and one of coordinated control settings No. 2, No. 3, No. 4, and No. 5. The conflict setting avoidance unit 43 extracts coordinated control setting No. 1 and one of coordinated control settings No. 2, No. 3, No. 4, and No. 5 as the pair of coordinated control settings causing the conflict of control.

Turning to FIG. 4B, the notification unit 45 transmits to the information terminal 1 a notification that notifies the user to segment the time band listed under the "condition" in the coordinated control setting extracted in S9 (S10). The controller 13 in the information terminal 1 causes the display 11 to display the display screen indicating the notification transmitted in S10 (S11).

Figure 8:
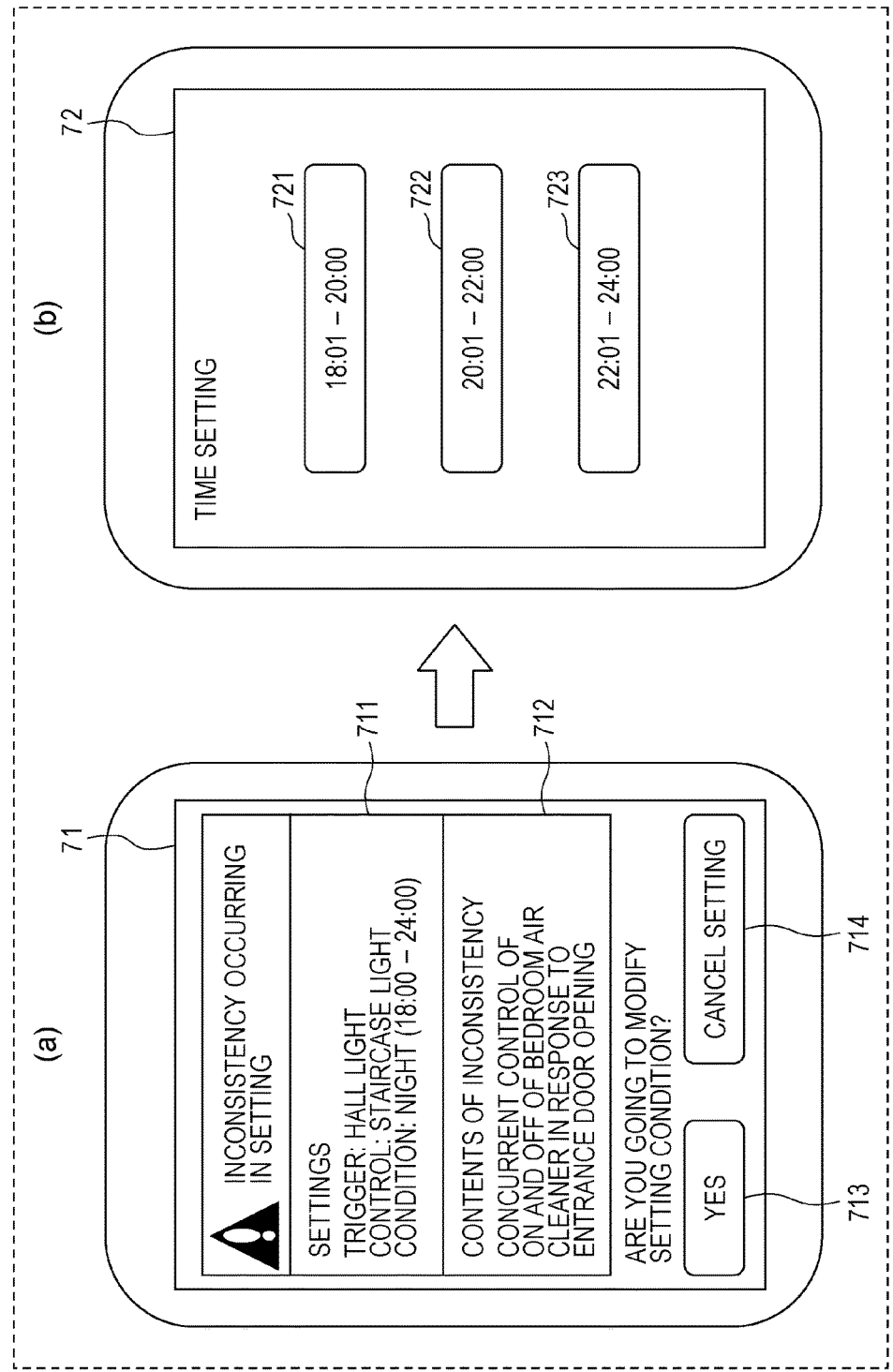
FIG. 8 illustrates an example of a display screen that displays a notification to prompt a user to segment a time band.

FIG. 8 illustrates display screens 71 and 72 that display a notification to prompt a user to segment a time band. FIG. 8(a) illustrates the display screen 71 that includes a display box 711 indicating contents of a coordinated control setting causing a conflict of control and a display box 712 indicating the control target device 300 that suffers from the conflict of control.

In this example, "turning on the bedroom cleaner" triggers the conflict of control on the bedroom air cleaner. The message in the display box 712 reads "Contents of inconsistency Trigger: Concurrent control of on and off of bedroom air cleaner in response entrance door opening" and indicates the control target device 300 on which the contents of trigger and the control operation conflict. The message in the display box 711 reads "Settings Trigger: Hall light Control: Staircase light Condition: Night (18:00-24:00)". The contents of coordinated control setting No. 7 are displayed as a time band change target.

The display screen 71 includes in a lower portion thereof a button 713 labeled "Yes", and a button 714 labeled "Cancel setting".

To change the coordinated control setting, the user chooses the button 713, and to discard a newly added coordinated control setting, the user chooses the button 714.

When an input resulting from choosing the button 713 is entered, the display 11 displays a display screen 72 illustrated in FIG. 8(b). The display screen 72 includes candidate display boxes 721 through 723 indicating multiple time band candidates to avoid a conflict of control.

FIG. 8(a) illustrates a conflict of control that occurs on the bedroom air cleaner during the night (18:00-24:00) in response to coordinated control setting No. 7. Accordingly, FIG. 8(b) displays candidate display boxes 721 through 723 respectively indicating three time band candidates "18:01-20:00", "20:01-22:00", and "22:01-24:00" in order to prompt the user to segment the night time band (18:00-24:00).

The user segments the time band specified by coordinated control setting No. 7 by choosing a desired one of the candidate display boxes 721 through 723 on the display screen 72.

Figure 9:
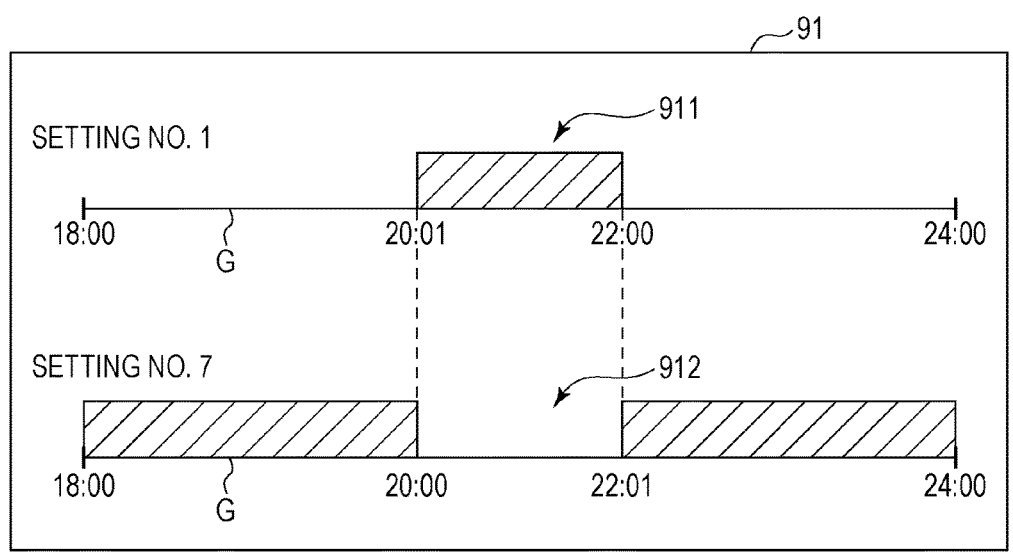
FIG. 9 illustrates another example of the display screen that prompts the user to segment the time band.

The display screen prompting the user to segment the time band is not limited to the display screen 72 illustrated in FIG. 8(b). FIG. 9 illustrates a display screen 91 as another example to prompt the user to segment the time band. The display screen 91 displays a slide bar 911 to segment the time band of coordinated control setting No. 1, and a slide bar 912 to segment coordinated control setting No. 7. Each of the slide bars 911 and 912 is labeled a gauge G. The left end of the gauge G indicates the start time of the time band prior to the time band segmentation, and the right end of the gauge G indicates the end time of the time band prior to the time band segmentation. Coordinated control settings No. 1 and No. 7 have the time band "18:00-24:00" prior to the time band segmentation, the left end of the gauge G is labeled "18:00" and the right end of the gauge G is labeled "24:00" in each of the slide bars 911 and 912.

The user chooses one of the slide bars 911 and 912, and sets the start time of the segmented time band by laterally sliding the left end of the selected slide bar, and sets the end time of the segmented time band by laterally sliding the right end of the selected slide bar. In this case, the user has selected the slide bar 911, has set the left end at 20:01, and the right end at 22:00.

In coordination with this user's setting, the slide bar 912 that has not been selected changes the display form such that the time band of the slide bar 912 does not overlap the time band set by the slide bar 911. In this way, the user segments the time bands of coordinated control settings No. 1 and No. 7 such that the time bands do not overlap. In this example, the slide bar 912 operates in coordination with the operation of the slide bar 911 such that the time band of No. 7 is segmented into "18:00-20:00" and "22:01-24:00".

FIG. 9 illustrates an example in which the user segments the time band using the slide bar. Alternatively, the user may segment the time band by directly entering time bands.

Turning to FIG. 4B, if the user enters an operation to segment the time band (yes branch from S12), the information terminal 1 transmits input results to the server 4. If the operation to segment the time band has not been entered (no branch from S12), processing returns to S11 to wait on standby for the inputting of the operation. If an operation to select the button 714 on the display screen 71 is performed as illustrated in FIG. 8(a), in other words, if an operation to cancel the newly added coordinated control setting has been entered, the determination result in S12 is yes.

If the conflict determination unit 42 determines in S8 that no conflict of control occurs (yes branch from S8), or if the operation to segment the time band has been entered in S12 (no branch from S12), processing proceeds to S13.

In S13, the updating unit 44 in the server 4 updates the contents of the corresponding coordinated control setting in the coordinated control setting table 61 in response to the input results. For example, if a time band "22:01-24:00" is selected on the display screen 72 of FIG. 8(b), the updating unit 44 updates the time band of coordinated control setting No. 7 to "22:01-24:00", and the time band of coordinated control setting No. 1 to "18:00-22:00" as illustrated in FIG. 6.

Even if the entrance door is opened during the time band 18:00-20:00, coordinated control setting No. 7 is not executed and a conflict of control on the bedroom air cleaner is avoided.

If processing proceeds to S13 subsequent to the no determination in S8, the updating unit 44 simply registers the newly added coordinated control setting No. 7 formally to the coordinated control setting table 61. If the button 714 is chosen to discard coordinated control setting No. 7 as illustrated in FIG. 8(a), and processing proceeds to S13, the updating unit 44 simply deletes coordinated control setting No. 7 that has been tentatively registered in the coordinated control setting table 61.

If one of the coordinated control settings in the coordinated control setting table 61 of FIG. 6 satisfies the trigger 63 and the condition 65, the notification unit 45 transmits a control signal of the corresponding control target device 300 to the HGW 34 via the network 5. The HGW 34 transmits the control signal to the control target device 300. In this way, the operation responsive to the coordinated control setting is performed. In accordance with the embodiment, the control target of the execution 64 is the control target device 300. The control target may be a sensor or a service. If the control target is a service, the server 4 may directly transmit the control signal to another server managing the service rather than transmitting the control signal to the HGW 34.

In accordance with the first embodiment, the updating unit 44 in the server 4 acquires the current status information of the control target device 300 via the communication with the HGW 34 that detects a change in the status of the control target device 300 on a real-time basis.

The above arrangement has been discussed as an example. The updating unit 44 in the server 4 may enquire the control target device 300 about the status thereof via the HGW 34 each time a process request is received from the information terminal 1.

The first embodiment focuses on the time band set depending on the condition of each of the coordinated control settings, and avoids a conflict of control on the same device by appropriately segmenting the time band. The technique of the first embodiment fixes one of the conflicting control operations at a higher priority than the other, and does not need a large number of settings to avoid a variety of conflict patterns. In accordance with the first embodiment, a conflict of control on the same device is easily avoided to meet the user's intention.

Second Embodiment

A second embodiment is free from displaying the display screen on the information terminal 1 prompting the user to segment the time band. The second embodiment avoids a conflict of control by adding an operational status of the control target device 300 to the condition 65 of the coordinated control setting that is a cause for the conflict. In the second embodiment, elements identical to those in the first embodiment are designated with the same reference numerals, and the discussion thereof is omitted herein.

In accordance with the second embodiment, the conflict setting avoidance unit 43 avoids a conflict of control by adding the operational status of a given control target device 300 to the condition 65. In this case, the conflict setting avoidance unit 43 determines the operational status of the control target device 300 to be added to the condition 65, by referencing the log information indicating the log of the operational status of the control target device 300 stored on the DB 41. The second embodiment is specifically described below.

FIG. 10 illustrates an example of log information 1000 to be stored on the DB 41. The server 4 generates and manages the log information 1000 by appropriately communicating with the WLAN_AP 33, the HGW 34, the HEMS 35, and the like. In the example of FIG. 10, the control operation specified by coordinated control setting No. 7 newly added when the user comes home at 20:00 is executed. The staircase light is turned on, the control operation specified in coordinated control setting No. 4 is performed in coordination therewith, and the bedroom light is turned on. The staircase light is turned off when the user goes to bed at 23:00, and the control operation specified in coordinated control setting No. 4 is then complete.

The television is turned on at 20:10, and is thus turned on within 10 minutes prior to or subsequent to 20:00 when the control operation specified in coordinated control setting No. 4 starts. The television is turned off at 22:55 and is thus turned off within 10 minutes prior to or subsequent to 23:00 when the control operation specified in coordinated control setting No. 4 ends. This suggests that the television is closely correlated with coordinated control setting No. 4, and that the television is likely to be turned on at 20:00 that is a start time of coordinated control setting No. 4. If "Television: off" is added to the condition of coordinated control setting No. 4, the control operation of coordinated control setting No. 4 is avoided when the user comes home.

Figure 11:
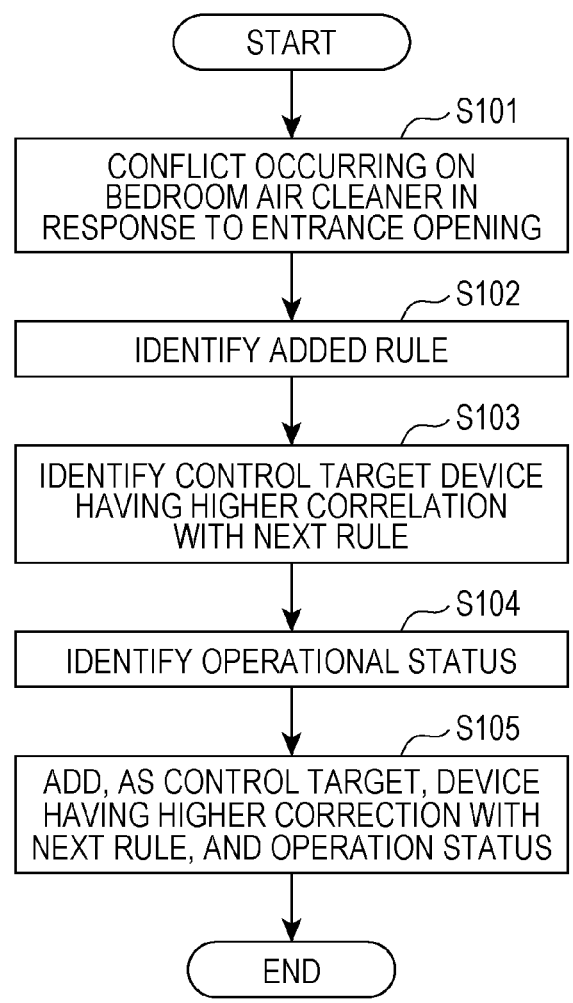
FIG. 11 is a flowchart illustrating an example of a process to avoid a conflict of control in a second embodiment.

FIG. 11 is a flowchart illustrating an example of a process to avoid a conflict of control in the second embodiment. In the flowchart, the coordinated control setting table 61 of FIG. 6 is also used. The routine of the flowchart of FIG. 11 may be executed when a conflict of control actually occurs or when a new coordinated control setting is added.

The conflict determination unit 42 determines that a conflict of control occurs on the bedroom air cleaner in response to a trigger of the opening of the entrance door by tracing the coordinated control setting table 61 of FIG. 6 (S101).

The conflict setting avoidance unit 43 identifies the most recently added coordinated control setting (hereinafter referred to as an "added rule") (S102). Coordinated control setting No. 7 is identified as the added rule.

The conflict setting avoidance unit 43 identifies a coordinated control setting that is coordinated with the added rule (hereinafter referred to as a "next rule", and corresponding to a fourth setting), and identifies a control target device 300 having a higher correlation with the identified next rule from the log information 1000 (S103). For example, the conflict setting avoidance unit 43 references the log information 1000 of the past one week, and identifies as a control target device 300 having a higher correlation with a control target device 300 with the operational status having changed by predetermined times (3 times, for example) within a time period prior to and subsequent to the start time of the next rule (for example, within a total of 20 minutes, namely, within 10 minutes prior to and subsequent to the start time), and within the time period prior to or subsequent to the end time of the next rule. In this case, coordinated control setting No. 4 is identified as the next rule. With reference to the log information 1000, the television has taken a change pattern in the operational status 3 times for the past one week. In the change pattern, the television is turned on within a predetermined time period prior to and subsequent to the start time (20:00) of coordinated control setting No. 4 (corresponding to a first operational status), and is turned off within the predetermined time period prior to and subsequent to end start time (23:00) of coordinated control setting No. 4 (corresponding to a second operational status). The television is thus identified as a control target device 300 having a higher correlation.

The conflict setting avoidance unit 43 identifies the operational status of a control target device 300 having a higher correlation with the next rule within a predetermined time period prior to and subsequent to the end time of the next rule (for example, for a total of 20 minutes, namely, within 10 minutes prior to and subsequent to the end time) (S104). Since the television is turned off at 22:55, 5 minutes before 23:00, which is the end time of coordinated control setting No. 4, the turning off the television is identified as the operational status.

The updating unit 44 adds to the next rule the control target device 300 having a higher correlation with the next rule, and the operational status identified in S104. Here, "Television: off" is added to the condition of coordinated control setting No. 4.

Even if the control operations specified by coordinated control settings No. 1 and No. 7 are executed in response to the entrance door opening serving as a trigger when the user comes home, the control operating specified in coordinated control setting No. 4 is not executed. As a result, control operations specified by coordinated control settings No. 5 and No. 6 are not performed, and a conflict of control is avoided on the bedroom air cleaner.

If the operational status of the control target device 300 having a higher correlation is added in the second embodiment, the display 11 in the information terminal 1 may display the control target device 300 becoming the addition candidate and the operational status thereof. If the user has permitted the addition of the condition, the conflict setting avoidance unit 43 may add the control target device 300 responsive to the condition 65 of the coordinated control setting and the operational status thereof.

The device coordinated control system of the embodiments has been described. The disclosure is not limited to the embodiments. Without departing from the scope of the disclosure, an embodiment may be configured by making various changes and modifications apparent to those skilled in the art to the embodiments, or by combining elements of the embodiments. Such an embodiment also falls within the disclosure.

The elements of FIG. 2 and FIG. 3 may be implemented by using dedicated hardware or by executing a software program. When the software program is used, elements may be implemented by a program executing unit, such as a central processing unit (CPU) or a processor, which reads the software program recorded on a hard disk or a semiconductor memory, and executes the read software program.

The technique of the disclosure finds applications in coordinated-controlling multiple control target devices connected via a network.

What is claimed is:

1. A method causing a processor to execute operations, comprising:
   storing a first setting in a memory for repeatable application, the first setting being configured to control a first device when an operation status of a second device interconnected to the first device via a network has changed;
   receiving a second setting, the second setting being stored in the memory for repeatable application and configured to control a third device when an operation status of a fourth device interconnected to the third device via the network has changed;
   determining, by the processor, whether conflicting operations are to be performed on a target device when the first setting and the second setting are executed;
   extracting, by the processor, a setting from the first setting and the second setting, which is a cause of the conflicting operations, when the conflicting operations are determined to be performed on the target device;
   determining, by the processor, a time during which the extracted setting is to be executed;
   transmitting a notification including a plurality of time bands to which the determined time is divided for user selection; and
   receiving user selections of a time band for the first setting modified to operate and a time band for the second setting modified to operate from the plurality of time bands, for a single instance, at different time bands than time bands specified for the first setting and the second setting for resolution of the conflicting operations.

2. The method according to claim 1,
wherein the second setting is set on a terminal, including a display, and
wherein the notification comprises an indication displayed on the display and indicates an occurrence of the conflicting operations.

3. The method according to claim 2,
wherein the notification comprises information concerning the target device that is under the conflicting operations.

4. The method according to claim 2,
wherein the notification comprises a message to receive an input to determine whether the extracted setting is to be modified to avoid the conflicting operations.

5. The method according to claim 4, further comprising causing the processor to display, on the display, the plurality of time bands included in the time for selection when the input is received.

6. The method according to claim 4, further comprising causing the processor to display, on the display, a slide bar to divide the time when the input is received.

7. The method according to claim 1,
wherein, in the determining, executing a simulation that traces the first setting and the second setting.

8. A method causing a processor to execute operations, comprising:
storing a first setting in a memory for repeatable application, the first setting being configured to control a first device when an operation status of a second device interconnected to the first device via a network has changed;
receiving a second setting, the second setting being stored in the memory for repeatable application and configured to control a third device when an operation status of a fourth device interconnected to the third device via the network has changed;
adding an operation condition of at least one of the first device in view of the operation status of the second device, and the third device in view of the operation status of the fourth device as the first setting or the second setting;
determining, by the processor, whether conflicting operations are to be performed on a target device when the first setting and the second setting are executed; and
extracting, by the processor, a setting from the first setting and the second setting, which is a cause of the conflicting operations, when the conflicting operations are determined to be performed on the target device;
determining, by the processor, a time during which the extracted setting is to be executed;
transmitting a notification including a plurality of time bands to which the determined time is divided for user selection; and
receiving user selections of a time band for the first setting modified to operate and a time band for the second setting modified to operate from the plurality of time bands, for a single instance, at different time bands than time bands specified for the first setting and the second setting for resolution of the conflicting operations.

9. The method according to claim 8, further comprising:
managing log information related to a log of operation statuses of a plurality of devices;
extracting, from the memory, a third setting, the third setting changing in coordination with the second setting as a condition of control of the extracted setting, and,
determining, by the processor and based on the log information, a correlative device having a higher frequency of occurrence (i) that a control operation to set a first operation status is performed within a predetermined period prior to or subsequent to a start of a control operation of the third setting, and (ii) that a control operation to set a second operation status different from the first operation status is performed within a predetermined period prior to or subsequent to an end of the control operation of the third setting; and
adding information that the correlative device is in the second operation status to the condition of control of the third setting.

10. A control apparatus comprising:
a processor; and
a memory having a program stored thereon, the program causing the processor to execute operations including:
storing a first setting for repeatable application, the first setting being configured to control a first device when an operation status of a second device which is interconnected to the first device via a network has changed;
receiving a second setting, the second setting being stored in the memory for repeatable application and configured to control a third device when an operation status of a fourth device interconnected to the third device via the network has changed;
determining whether conflicting operations are to be performed on a target device when the first setting and the second setting are executed;
extracting a setting from the first setting and the second setting, which is a cause of the conflicting operations, when the conflicting operations are determined in the determining to be performed on the target device;
determining a time during which the extracted setting is to be executed;
transmitting a notification including a plurality of time bands to which the determined time is divided for user selection; and
receiving user selections of a time band for the first setting modified to operate and a time band for the second setting modified to operate from the plurality of time bands, for a single instance, at different time bands than time bands specified for the first setting and the second setting for resolution of the conflicting operations.

11. A non-transitory recording medium having a program stored thereon, the program causing a processor to execute operations comprising:
storing a first setting in a memory for repeatable application, the first setting being configured to control a first device when an operation status of a second device which is interconnected to the first device via a network has changed;
receiving a second setting, the second setting stored in the memory for repeatable application and being configured to control a third device when an operation status of a fourth device interconnected to the third device via the network has changed;
determining whether conflicting operations are to be performed on a target device when the first setting and the second setting are executed;
extracting a setting from the first setting and the second setting, which is a cause of the conflicting operations, when the conflicting operations are determined in the determining to be performed on the target device;

determining a time during which the extracted setting is to be executed;

transmitting a notification including a plurality of time bands to which the determined time is divided for user selection; and receiving user selections of a time band for the first setting modified to operate and a time band for the second setting modified to operate from the plurality of time bands, for a single instance, at different time bands than time bands specified for the first setting and the second setting for resolution of the conflicting operations.

12. The method according to claim 1, wherein, when the one or more time bands among the plurality of time bands are selected, the extracted setting is executed during the selected one or more of the plurality of time candidates.

13. The method according to claim 12, wherein the extracted setting is executed only during the selected one or more time bands.

\* \* \* \* \*